(12) United States Patent
Danforth et al.

(10) Patent No.: US 8,636,247 B2
(45) Date of Patent: Jan. 28, 2014

(54) CLOSED GAS GENERATOR AND MICRO POWER UNIT INCLUDING THE SAME

(75) Inventors: Jeremy C. Danforth, Tucson, AZ (US); Richard D. Loehr, Tucson, AZ (US); Kevin P. Murphy, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 220 days.

(21) Appl. No.: 13/089,441

(22) Filed: Apr. 19, 2011

(65) Prior Publication Data

US 2012/0269633 A1     Oct. 25, 2012

(51) Int. Cl.
    *B64C 15/00*     (2006.01)
(52) U.S. Cl.
    USPC .............. 244/73 R; 60/777; 60/723; 60/736
(58) Field of Classification Search
    USPC ........ 244/73 R, 74, 75.1, 171.1; 60/777, 723, 60/39.463, 736
    See application file for complete search history.

(56) References Cited

U.S. PATENT DOCUMENTS

| | | | | |
|---|---|---|---|---|
| 3,298,182 A * | 1/1967 | Webb | | 60/251 |
| 3,303,651 A * | 2/1967 | Grant, Jr. et al. | | 60/203.1 |
| 3,392,528 A * | 7/1968 | Moutet et al. | | 60/220 |
| 3,673,801 A * | 7/1972 | Goldberger | | 60/218 |
| 3,740,198 A * | 6/1973 | Sandlin et al. | | 422/222 |
| 3,757,520 A * | 9/1973 | Murfree et al. | | 60/219 |
| 4,211,072 A * | 7/1980 | Twardy et al. | | 60/203.1 |
| 4,288,982 A * | 9/1981 | Frosh et al. | | 60/200.1 |
| 4,517,798 A * | 5/1985 | Roberts | | 60/39.462 |
| 6,272,846 B1 * | 8/2001 | Schneider | | 60/218 |
| 6,311,477 B1 * | 11/2001 | Schneider | | 60/218 |
| 6,314,718 B1 * | 11/2001 | Schneider | | 60/218 |
| 6,378,291 B1 * | 4/2002 | Schneider | | 60/218 |
| 6,959,549 B2 | 11/2005 | Tilston | | |
| 2004/0035982 A1 * | 2/2004 | Capozzi et al. | | 244/172 |
| 2005/0226727 A1 | 10/2005 | Dennis et al. | | |
| 2006/0042262 A1 | 3/2006 | Ganev et al. | | |
| 2007/0031303 A1 | 2/2007 | Kaiser et al. | | |
| 2007/0169461 A1 | 7/2007 | Koerner | | |
| 2009/0145998 A1 | 6/2009 | Salyer | | |
| 2010/0123041 A1 | 5/2010 | Nair et al. | | |

OTHER PUBLICATIONS

"International Application Serial No. PCT/US2012/025555, International Search Report mailed May 30, 2012", 2 pgs.
"International Application Serial No. PCT/US2012/025555, Written Opinion mailed May 30, 2012", 7 pgs.

(Continued)

*Primary Examiner* — Philip J Bonzell
(74) *Attorney, Agent, or Firm* — Schwegman, Lundberg & Woessner, P.A.

(57) ABSTRACT

A gas generator assembly includes a propellant chamber housing an amine based propellant. A reaction chamber is coupled with the propellant chamber. The reaction chamber includes a reaction chamber housing, and a porous reaction matrix within the reaction chamber housing. The reaction matrix includes a catalyzing agent, and the catalyzing agent is configured to non-combustibly catalyze the amine based propellant into one or more pressurized gases. An injector is in communication with the propellant chamber. The injector is configured to deliver the amine based propellant to the porous reaction matrix. A discharge nozzle is coupled with the reaction chamber and is configured to accelerate and discharge the one or more pressurized gases. In one example, the gas generator is coupled with one or more of an impulse turbine assembly and an electric generator to form a micro power unit.

16 Claims, 9 Drawing Sheets

(56) References Cited

OTHER PUBLICATIONS

Prisell, Erik, et al., "A Study of an User and Environmental Friendly Stored Energy Based EPU/APU System for Military Aerospace Applications", 26th International Congress of the Aeronautical Sciences (ICAS), (Sep. 2008), 1-16.

"International Application Serial No. PCT/US2012/025555, International Preliminary Report on Patentability mailed Apr. 26, 2013", 28 pgs.

* cited by examiner

CLOSED GAS GENERATOR AND MICRO POWER UNIT INCLUDING THE SAME

TECHNICAL FIELD

Embodiments pertain to closed system gas generators operating without ambient air and micro power units and unmanned air vehicles using the same.

BACKGROUND

Small scale unmanned air vehicles (UAVs) and other small scale vehicles and field operated devices often use batteries for electrical and electro-mechanical operation. Batteries are often heavy and add significant weight to these devices and UAVs. In the case of UAVs added battery weight diminishes performance and flight time. Additionally, batteries often take up significant amounts of space within devices that would otherwise be devoted to miniaturizing devices or adding additional functionality. In UAVs a larger fuselage is required to contain the batteries needed for operation. Further, a larger propulsion source (e.g., a motor and propeller) and wings with attendant weight increases for both may be needed to ensure a battery operated UAV has the performance and lifespan required.

Further, in at least some circumstances it is often necessary to store battery operated devices and UAVs for significant periods (e.g., months, years and the like) before operation is desired. Batteries frequently lose all or part of their charge when stored. Devices and UAVs including aged batteries may thereby have no or limited performance and correspondingly have limited reliability in the field. In some circumstances, for instance during deployment and when remote from a source of resupply, it may be extremely difficult to find a replacement battery or recharge a battery without special equipment that may not be available or portable.

SUMMARY

In accordance with some embodiments, the non-combusting gas generator described herein provides an assembly configured to generate a source of exhaust gas for use in a micro power unit. The non-combusting gas generator includes a propellant chamber housing a dense non-combustible propellant. The propellant is introduced to a reaction chamber including a porous reaction matrix having a catalyst suspended in the porous reaction matrix. The catalyst catalyzes the propellant within the reaction matrix and generates exhaust gases for use by one or more mechanical and electrical systems. Combining the gas generator with power generation systems including, but not limited to, turbine assemblies and electric generators forms a micro power unit configured to generate significant power as a closed compact system.

The gas generator assembly introduces and consumes the propellant (e.g., an amine based propellant, such as hydroxyl ammonium nitrate) within a closed system. The gas generator assembly does not require ambient air mixed with the propellant to catalyze or react the propellant and produce the exhaust gases. Stated another way, the gas generator assembly does not combust the propellant (e.g., with ambient air). Instead, the propellant is catalyzed within a closed system and the exhaust gases are reliably produced in substantially any environment (e.g., vacuum, high and low oxygen environments and the like).

Further, the propellant used with the gas generator assembly is a stable non-combustible propellant. In one example, the propellant is an amine based propellant, such as a hydroxyl ammonium nitrate. As described herein, the amine based propellant is catalyzed within the porous reaction matrix including a catalyst to produce exhaust gases. The non-combusting propellant is not combustible by itself and is correspondingly stable. Accordingly, the propellant may be stored for months or years with no significant performance degradation. Additionally, because the propellant is non-combustible it is a minimal hazard to transport and store relative to other combustible propellants. Further still, in the case of the amine based propellant described herein the propellant is dense (e.g., with a specific gravity greater than around 1.6) and a small amount of the propellant generates a significant amount of exhaust gas. The gas generator assembly including the amine based propellant thereby has a small form factor. The gas generator assembly is readily incorporated as a compact component of devices including miniaturized UAVs and other field equipment while still delivering significant power to the devices over a specified operational lifespan.

Moreover, the exhaust gas generated by the non-combusting gas generator is directed through a discharge nozzle for use by one or more components. In one example, the exhaust gas is accelerated to supersonic velocity (e.g., 5000 to 7000 feet per second) and impinges against one or more tangential cups of an impulse turbine. The impulse turbine relies heavily on the velocity of the exhaust gas to rotate and correspondingly generate power (as opposed to volumetric flow rate used in axial turbines). The discharge nozzle minimizes the volumetric flow rate and thereby conserves the propellant for extended performance of the gas generator assembly and operation of the impulse turbine. As described herein the impulse turbine assembly is coupled with one or more of an electric generator to generate electric power or a reduction drive coupled with a propulsion device (e.g., a propeller) of a miniaturized UAV. Furthermore, during operation of the gas generator the propellant is gradually consumed and exhausted from the UAV. The weight of the UAV gradually decreases over its operation and thereby allows the gas generator and the other components of the micro power unit to efficiently power the lighter weight UAV.

BRIEF DESCRIPTION OF THE DRAWINGS

A more complete understanding of the present subject matter may be derived by referring to the detailed description and claims when considered in connection with the following illustrative Figures. In the following Figures, like reference numbers refer to similar elements and steps throughout the Figures.

Elements and steps in the Figures are illustrated for simplicity and clarity and have not necessarily been rendered according to any particular sequence. For example, steps that may be performed concurrently or in different order are illustrated in the Figures to help to improve understanding of examples of the present subject matter.

DESCRIPTION OF THE DRAWINGS

In the following detailed description, reference is made to the accompanying drawings which form a part hereof, and in which is shown by way of illustration specific examples in which the subject matter may be practiced. These examples are described in sufficient detail to enable those skilled in the art to practice the subject matter, and it is to be understood that other examples may be utilized and that structural changes may be made without departing from the scope of the present subject matter. Therefore, the following detailed description is not to be taken in a limiting sense, and the scope of the present subject matter is defined by the appended claims and their equivalents.

The present subject matter may be described in terms of functional block components and various processing steps. Such functional blocks may be realized by any number of techniques, technologies, and methods configured to perform the specified functions and achieve the various results. For example, the present subject matter may employ various materials, actuators, electronics, shape, airflow surfaces, reinforcing structures, propellants and the like, which may carry out a variety of functions. In addition, the present subject matter may be practiced in conjunction with any number of devices, and the systems described are merely exemplary applications.

Figure 1:
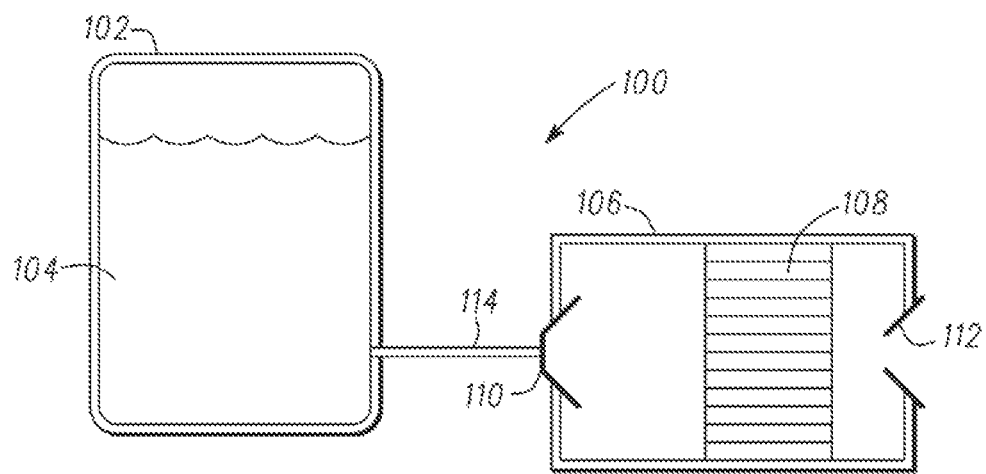
FIG. 1 is a schematic view of one example of a non-combusting gas generator.

FIG. 1 shows one example of a gas generator assembly 100. As described in further detail below the gas generator assembly 100 non-combustibly generates exhaust gas, for use in one example within a micro-power unit. As shown, the gas generator assembly 100 includes a propellant chamber 102 coupled with a reaction chamber 106. The propellant chamber 102 includes a propellant, such as an amine based propellant. In one example, the propellant 104 is a liquid propellant housed in the propellant chamber 102 configured for delivery through a propellant passage 114 to the reaction chamber 106. The reaction chamber 106 includes a porous reaction matrix 108 (e.g., a catalyst bed) configured to receive the propellant 104 from the propellant chamber 102 and catalyze the propellant to produce one or more high temperature exhaust gases. As shown in FIG. 1, in one example, the reaction chamber 106 includes an injector 110 sized and shaped to couple the reaction chamber 106 with the propellant passage 114 extending from the propellant chamber 102. The injector 110 includes, but is not limited to, an atomizer configured to atomize the liquid propellant 104 delivered through the propellant passage 114. Atomizing of the propellant 104 sprays the propellant across the reaction chamber 106 and ensures the propellant is delivered through substantially all of the passages within the porous reaction matrix 108. The reaction chamber 106 further includes a discharge nozzle 112 at an opposed end of the reaction chamber 106 from the injector 110. As will be described in further detail below, the discharge nozzle 112 is sized and shaped to receive exhaust gases developed through catalyzation of the propellant 104 within the porous reaction matrix 108. The discharge nozzle 112 is further configured to accelerate the exhaust gases from the reaction chamber 106 to high velocity, for instance, supersonic velocity. The exhaust gases are delivered through the discharge nozzle 112 to one or more components including but not limited to a turbine, rocket motor and the like.

As shown in FIG. 1, the gas generator assembly 100 is a substantially closed system. The propellant 104 within the propellant chamber 102 is isolated from the outside environment. Stated another way the propellant 104, such as an amine based propellant, is not mixed with any other fuel or gas such as ambient air prior to delivery to the reaction chamber 106. The propellant 104 including, for instance an amine based propellant (e.g., hydroxyl ammonium nitrate), is instead delivered through the propellant passage 114 (for instance, through a check valve in the propellant passage) and into the reaction chamber 106 where the amine based propellant by itself reacts with the porous reaction matrix 108 to produce one or more exhaust gases at elevated temperatures and elevated pressure.

As will be described in further detail below, the exhaust gases developed in the reaction chamber 106, for instance, through the catalyzation of the propellant 104 by the porous reaction matrix 108 provide a high velocity stream of gas through the discharge nozzle 112 capable of operating one or more components against which the discharge gas impinges (e.g., an impulse turbine assembly within a micro-power unit). The high velocity stream of gas provided by the discharge nozzle 112 allows the gas generator assembly 100 to operate components such as impulse turbines with a minimal volumetric flow rate in combination with a high velocity flow of gas. Because the gas generator assembly 100 relies on the discharge of high velocity of gases through the discharge nozzle 112 the assembly is miniaturized relative to other assemblies such as axial power generation assemblies including axial turbines that rely heavily on volumetric flow rate to generate adequate power. In contrast to previous systems, the gas generator assembly 100 uses an amine based propellant 104 having a high specific gravity (e.g., greater than 1.6) and corresponding high density that is compact relative to other fuels that require the mixture of a propellant with ambient air. By using a propellant 104, such as the amine based propellant, by itself without the addition of any ambient air or other fuels the gas generator assembly 100 is substantially minimized relative to the other power generation assemblies requiring mixed fuels.

Referring again to FIG. 1, the catalyzation of the propellant 104 generates hot exhaust gases, for instance, exhaust gases reaching temperatures of around 1200 degrees Fahrenheit or more. The reaction chamber 106 as will be described below is constructed with robust materials to withstand the temperature and pressure of the exhaust gases generated therein. In one example, the reaction chamber 106 generates one or more of nitric oxides, nitrous oxides and oxygen. As previously described, the exhaust gases are discharged through the discharge nozzle 112 at high pressure to generate mechanical power, electricity and the like for use in miniaturized unmanned air vehicles, rocket motors, battery chargers, other electrical devices and the like. Stated another way, the gas generator assembly in combination with for instance a turbine assembly comprises a micro-power unit configured to generate one or more of mechanical and electrical power within a compact package.

Figure 2:
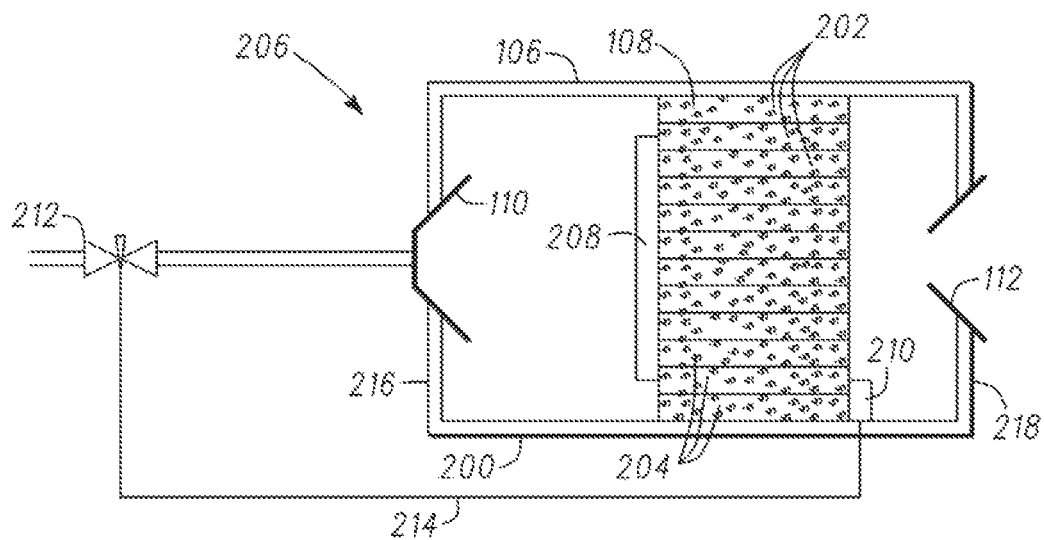
FIG. 2 is a schematic view of one example of a reaction chamber for use with the non-combusting gas generator shown in FIG. 1.

FIG. 2 shows one example of the reaction chamber 106. As shown, the reaction chamber 106 shown in FIG. 2 includes the porous reaction matrix 108 within a reaction chamber body 200. As previously described, the propellant 104 delivered to the reaction chamber 106 is catalyzed by the porous reaction matrix 108. Referring to FIG. 2, the porous reaction matrix 108 is shown with a plurality of matrix passage 202 extending therethrough. For instance, as shown in FIG. 2, the matrix passages 202 extend from a portion of the reaction chamber 106 adjacent to the chamber proximal portion 216 to the chamber distal portion 218 (adjacent to the discharge nozzle 112).

The porous reaction matrix 108, for instance a catalyst bed, in one example includes a plurality of linear matrix passages 202 extending therethrough. In another example, the porous reaction matrix 108 includes sheets or members of a matrix substrate such as aluminum oxide ($Al_2O_3$). In one example, the matrix passages 202 are formed by horizontal and vertical plates formed into a grid with the matrix passages. The catalyst 204 is positioned on the walls of the matrix passages 202 and is thereby exposed to the propellant 104 as the propellant is delivered through the porous reaction matrix 108. As shown in FIG. 2, the catalyst 204 is shown with stippling along each of the plurality of matrix passages 202. In one example, the catalyst 204 includes but is not limited to platinum (Pt) and the like. The platinum catalyzes the amine based propellant 104 contained within the propellant chamber 102. As previously described, the exposure of the catalyst 204 to the propellant 104 generates one or more exhaust gases at high temperature and high pressures, for instance, the exhaust gases include nitrous oxide, nitric oxide, oxygen and the like. In one example, the catalyst 204 initiates and accelerates the disassociation of the propellant 104 into the exhaust gases. In another example, the exhaust gases are generated and have a temperature of around 1200 degrees Fahrenheit. The reaction chamber body 200 is constructed with materials that are substantially robust when containing exhaust gases at these temperatures and high pressures, for instance, pressures greater than 300 to 400 psi. For instance, the reaction chamber body 200 is constructed with but not limited to metals such as stainless steel, aluminum, titanium and the like.

FIG. 2 also shows one example of a preheating assembly 206 coupled with the reaction chamber 106. In one example, the preheating assembly 206 includes a preheater 208 coupled with the porous reaction matrix 108. In one example, the preheater 208 includes a porous substrate coupled over a plurality of the matrix passages 202. As shown in FIG. 2, the preheater 208 blankets a majority of the matrix passages 202. In another example, the preheater 208 is coupled over a smaller subset of the matrix passages 202. In one example, the preheater 208 includes a hypergolic solid powder contained within a porous pillow such as sandwiched layers of cellulose containing the hypergolic powder therein. As the propellant 104 is introduced to the reaction chamber 106 the propellant 104 passes through the porous preheater 208 and reacts with the hypergolic powder within the preheater 208. The amine based propellant 104 immediately reacts with the preheater 208 and rapidly generates heat that correspondingly heats the porous reaction matrix 108. In one example, the hypergolic composition used with the preheater 208 includes but is not limited to a mixture of sodium chlorohydrate, cupric oxide (e.g., 0.1 to 1 percent mass), magnesium (e.g., 1 to 10 percent mass). In one example, trace elements of cupric oxide and magnesium facilitate the reaction between the preheater 208 and the propellant 104. In yet another example, the preheater 208 includes lithium borohydride. Where the hypergolic composition includes lithium borohydride cuprix oxide may be removed from the composition as the lithium borohydride performs a similar function within the preheater 208.

As further shown in FIG. 2, the preheating assembly 206 further includes, in one example, a temperature sensor 210 coupled with the porous reaction matrix 108. The temperature sensor 210 is coupled along an opposed surface of the porous reaction matrix 108. In another example, the temperature sensor 210 is coupled with the porous reaction matrix 108 at a different location, for instance, within the porous reaction matrix or along the identical surface of the porous reaction matrix to the preheater 208. As shown in FIG. 2, the temperature sensor 210 is coupled with a propellant control valve, for instance, a needle valve 212 through a control coupling 214. In one example, one or more of the temperature sensor 210 and the propellant control valve 212 includes a mechanism (e.g., software, hardwiring, a thermostat, mechanical operator and the like) configured to operate the propellant control valve 212 according to the temperature measurement of the temperature sensor 210.

In one example, the operation of the gas generator assembly 100 includes an initial step where the temperature sensor 210 opens the propellant control valve 212 a small amount to allow a small pulse of amine based propellant 104 into the reaction chamber 106. The small pulse reacts with the preheater 208 to preheat the porous reaction matrix 108. Upon a determination by the temperature sensor 210 and that a desired threshold temperature has been reached in the porous reaction matrix the propellant control valve 212 (e.g., according to the control mechanism) is fully opened to allow a full stream of the propellant 104 into the reaction chamber 106 for catalyzing by the now preheated porous reaction matrix 108. The preheated porous reaction matrix 108 initiates and accelerates the catalyzation of the the propellant 104 thereby ensuring the generation of exhaust gases for discharge through the discharge nozzle 112. In one example, the preheater 208 preheats the porous reaction matrix 108 and the catalyst 204 to an initiation temperature configured to initiate and accelerate the breakdown of the propellant 104 (e.g., from around 260 degrees Celsius to 1100 degrees Celsius). In another example, where the porous reaction matrix 108 and the catalyst 204 are preheated to these temperatures the catalyst is maintained within the matrix and with cleaning of the gas generator assembly 100 and recharging with propellant 104 the assembly 100 is readily operated again. The gas generator assembly 100 may thereby be recycled for continued repeated use.

In operation, the amine based propellant 104 is delivered by itself (e.g., without any other fuel or ambient air) through the atomizer 110 through the porous reaction matrix 108. In one example, as described above the porous reaction matrix 108 is preheated with the preheating assembly 206 including, for instance, the preheater 208. The amine based propellant 104 is a non-combustible propellant and is catalyzed by the porous reaction matrix 108. Stated another way, because the amine based propellant 104 is non-combustible mixing with ambient air and other fuels is not needed as the amine based propellant is configured to react by itself with the porous reaction matrix 108. The non-combustible catalyzation of the non-combustible amine based propellant 104 with the porous reaction matrix 108 makes the gas generator assembly 100 (see FIG. 1) substantially non-hazardous relative to other combustion generator systems. For instance, the amine based propellant 104 is stable and not hazardous relative to other combustible fuels and propellants.

Further, because the gas generator assembly 100 including the reaction chamber 106 uses an amine based propellant 104 without any other fuels the amine based propellant provides a substantially dense (relative to water) propellant that uses only a small amount of propellant per unit time That is to say, the porous reaction matrix 108 is configured to catalyze the amine based propellant 104 for a few seconds to over a minute with a small miniaturized package carrying a correspondingly small propellant charge in the propellant chamber 102. As described in further detail below, the porous reaction matrix 108 catalyzes the amine based propellant 104 to generate a high velocity stream of gas. The exhaust gas is accelerated through the discharge nozzle 112 and is delivered to mechanical components configured to utilize the high velocity gas without requiring a significant volumetric flow as in the case of radial turbines as opposed to axial turbines and the like that require high volumetric flow rates. Stated another way, other power generation devices require a propellant mixed with other fuels and ambient air to generate a large volumetric flow rate for power generation. The mixture of these fuels require additional mechanical features, for instance, gas inlets, compressors and the like. The gas generator assembly 100 described herein including the porous reaction matrix 108 within the reaction chamber 106 precludes the inclusion of these mechanical features and instead relies on a single source of propellant such as the propellant 104 (an amine based propellant) within the reaction chamber 106 to generate a high velocity stream of exhaust gases with a corresponding low volumetric flow rate. When paired with cooperative mechanical and chemical devices such as impulse turbines, electric generators, rocket motors and the like these cooperating devices are able to capitalize on the high velocity stream exhaust gases without otherwise requiring large volumetric flow rates. The gas generator assembly 100 (as part of a micro-power unit incorporating these other components) is thereby able to provide a significant amount of power without requiring a large amount of fuel or mixing of fuel with ambient air, other propellants and the like.

Figure 3A:
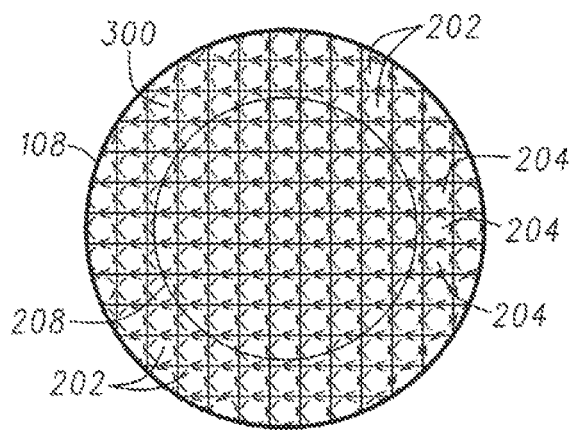
FIG. 3A is a front view of one example of a porous reaction matrix for use with the reaction chamber shown in FIG. 2.
Figure 3B:
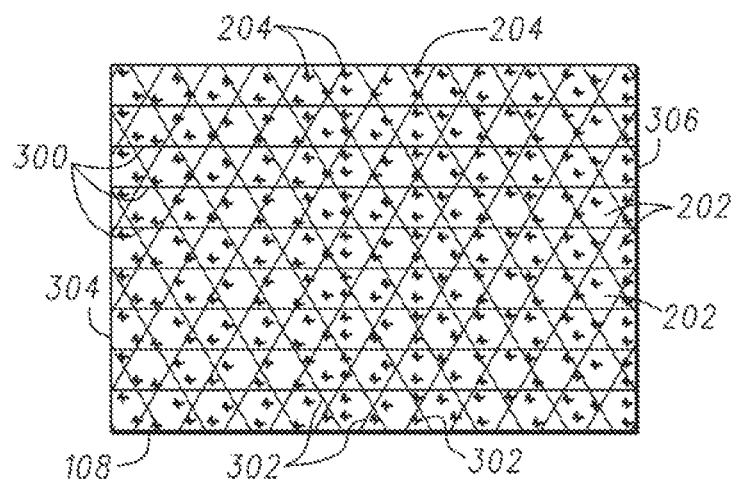
FIG. 3B is a side view of one example of the porous reaction matrix shown in FIG. 3A.

Referring now to FIGS. 3A and 3B, front and side views of the porous reaction matrix 108 are shown. Referring first to FIG. 3A, the plurality of matrix passages 202 are shown extending in and out of the page. As previously described, in one example, the porous reaction matrix 108 is comprised of a matrix of members, plates or sheets, for instance, a matrix grid 300 including a plurality of vertical and horizontal members, plates and the like. In one example, the matrix grid 300 includes a plurality of mesh or porous members constructed with but not limited to aluminum oxide. In one example, the preheater 208 is shown extending over a plurality of the matrix passages 202.

Referring now to FIGS. 3A and 3B, as previously described the catalyst 204 is provided along the matrix passages 202. As shown in FIG. 3A, the catalyst 204 is provided on the interior of each of the matrix passages 202. For instance, the catalyst 204 is provided along the interior of each of the matrix passages 202. Referring to FIG. 3B, as shown the catalyst 204 is provided along the length of each of the matrix passages 202. In one example, where the matrix grid 300 of the porous reaction matrix 108 is a matrix mesh, for instance having an interstitial spaces, the catalyst 204 (e.g., platinum) is positioned within the interstitial spaces of the matrix grid 300 as shown in FIG. 3B. In one example, the catalyst 204 is provided within the porous reaction matrix 108 from the matrix proximal portion 304 to the matrix distal portion 306. By providing the catalyst 204 in substantially all of the matrix passages 202 the reaction chamber 106 ensures that the propellant administered to the porous reaction matrix 108 from the injector 110 contacts the catalyst 204 no matter what matrix passage 202 the propellant is delivered through.

As shown in FIGS. 2, 3A and 3B, the porous reaction matrix 108 includes a plurality of linear matrix passages 202. As previously described, substantially all of the matrix passages 202 include the catalyst 204 positioned therein. This ensures that the propellant 104 introduced into the reaction chamber 106 is catalyzed by the catalyst 204 no matter what matrix passage 202 the propellant is delivered through. The linear channels of the porous reaction matrix 108 substantially minimize stagnation points within the porous reaction matrix and minimize any overheating of the matrix and the reaction chamber 106. Stated another way, the linear matrix passages 202 provide a consistent and reliable pathway for the propellant to move through the porous reaction matrix 108 without generating heat concentrations (e.g., hot spots) within the porous reaction matrix 108 that may otherwise damage the matrix and possibly the reaction chamber 106. Further, the provision of a plurality of linear matrix passages 202 substantially minimizes or eliminates bottle necks or choke points within the porous reaction matrix. The linear passages 202 thereby ensure that the flow of propellant 104 through the porous reaction matrix is done in a rapid and efficient manner without any full or partial stagnation within the porous reaction matrix. The efficient delivery of exhaust gases from the porous reaction matrix 108 to the discharge nozzle 112 is thereby substantially ensured.

Although a porous reaction matrix 108 including linear matrix passages 202 has been described herein, in other examples, the reaction chamber 106 includes a reaction matrix composed of, but not limited to, reticulated foam, honeycomb passages and the like. As with the porous reaction matrix 108 described herein, the other options for the matrix (e.g., a catalyst bed) include the catalyst such as platinum impregnated with the other matrix types. For instance, with a reticulated foam, platinum particles are administered throughout the reticulated foam to ensure catalyzation of the propellant as the propellant is delivered through the foam.

Figure 4:
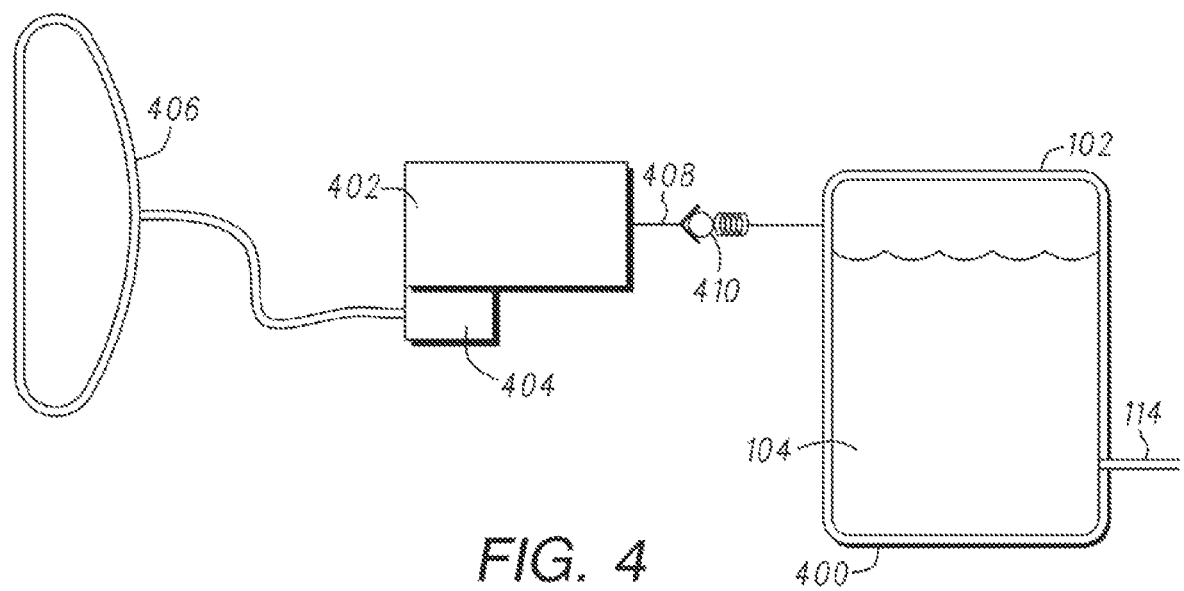
FIG. 4 is a schematic view of an example propellant chamber and an example pressure generator coupled with the propellant chamber.

FIG. 4 shows one example of the propellant chamber 102 previously shown in FIG. 1. The propellant chamber 102 includes a propellant chamber body 400 configured to retain the propellant 104 therein under pressure, for instance, the propellant chamber body 400 is constructed with materials including but not limited metals, such as stainless steel, aluminum, titanium and the like. The propellant chamber 102 is configured to retain the propellant 104 at pressures of around 300 to 400 psi or greater. In one example, the propellant chamber 102 includes a deflectable inner bladder (shown with the inner line in FIG. 4) that cooperates with the pressure generator 402 (described below) pressurize and deliver the propellant into the reaction chamber 106. For instance, the bladder includes a deflectable foil substrate including, but not limited to, stainless steel, aluminum and the like around 1 to 2 millimeters thick. In another example, a PE, HDPE, PTFE liner or the like is sprayed on the interior of the bladder to ensure the propellant 104 does not interact with the bladder material (though the bladder material is already substantially inert).

As previously described, the propellant chamber 102 is configured to contain an amine based propellant, such as hydroxyl ammonium nitrate (HAN). The propellant 104 contained within the propellant chamber 102 of the gas generator assembly 100 is a non-combustible propellant instead of hazardous and unstable compounds that burn or are explosive in nature and correspondingly have a relatively short shelf life.

The amine based propellant 104 contained within the propellant chamber 102 has a substantially long shelf life, for instance, 20 years or longer. Additionally, the amine based propellant 104 used with the gas chamber assembly 100 and stored within the propellant chamber 102 does not need ambient air for catalyzation. For instance, as previously described, the porous reaction matrix 108 is configured to catalyze the amine based propellant 104 by itself without additional fuels, ambient air and the like. The controlled introduction of a fuel or ambient air to the propellant along with the mechanical and control systems needed for the controlled introduction of such materials is thereby avoided. The propellant chamber 102 a pressurized chamber in communication with the reaction chamber 106 through the propellant passage 114. Complex compressors, fans, injectors and the like are thereby substantially avoided.

In one example, the propellant 104 within the propellant chamber 102 is a dense propellant, for instance, an amine based propellant having a specific gravity of 1.6 or greater (at least 60% heavier than liquid water). The use of a dense propellant provides a small form factor (e.g., a small volume of the propellant includes a relatively high power output) for the gas generator assembly 100. The dense propellant is gradually atomized through the injector 110 and catalyzed within the porous reaction matrix 108 shown in FIG. 1 over seconds or longer (depending on the volume stored in the chamber 102) to provide a consistent stream of propellant for operation of the gas generator assembly 100. Stated another way, the amine based propellant 104 stored within the propellant chamber 102 provides a significant amount of energy and power per unit volume for the gas generator assembly 100 (and a micro power unit including the same).

In one prophetic example, the gas generator assembly 100 (when coupled with an impulse turbine assembly and electric generator, as described below) including the propellant 104 has a power density of around 882 Watts per kilogram and an energy density of around 88 Watt-hours per kilogram assuming sufficient volume and mass of the propellant 104 is provided for around six minutes of operation. In one example, the gas generator assembly 100 operable for around six minutes is incorporated within a miniature UAV, such as the UAV 800 shown in FIG. 8. In contrast to the gas generator assembly 100 incorporated within a micro power unit (e.g., see 501 and 701 below), a corresponding battery power system configured to run for around six minutes may provide a power density of around 30 to 600 Watts per kilogram and an energy density of around 3 to 60 Watt hours per kilogram (for six minutes of operation). The gas generator assembly 100 thereby provides more power per kilogram than an equivalent battery system. Further, the gas generator assembly 100 loses weight throughout operation as the propellant 104 is catalyzed and discharged. When the gas generator assembly 100 is incorporated within a device, such as a UAV, the UAV uses the constant power generation of the assembly 100 in combination with the gradually decreasing weight of the assembly 100 to leverage greater operational periods for the device. Alternatively the volume of propellant (and its corresponding mass) is decreased while maintaining a similar operational period to a heavier battery system.

As further shown in FIG. 4, in one example, the gas generator assembly 100 includes a pressure generator 402 coupled with the propellant chamber 102 through a pressurization passage 408. The pressure generator 402 is configured to pressurize the propellant 104 within the propellant chamber 102 and correspondingly deliver the propellant through the propellant passage 114 to the reaction chamber 106 where it is catalyzed by the porous reaction matrix 108. The pressure generator 402 includes, but is not limited to, a variety of pressure generator mechanism, for instance, squibs, piston operated pressure generators, chemically operated pressure generators and the like. In one example, the pressure generator 402 is activated with an activator 404 coupled with the pressure generator. For instance the activator 404 includes, in one example, a lanyard 406 sized and shaped to initiate a reaction or mechanical operation within the pressure generator 402 to deliver pressure to the propellant chamber 102 and thereby deliver the propellant 104 through the propellant passage 114 to the reaction chamber 106.

In another example, the pressurization passage 408 includes a check valve 410 sized and shaped to ensure the propellant 104 within the propellant chamber 102 is unable to move into the pressure generator 402. In one example, the check valve 410 includes but is not limited to a ball check valve that readily permits the passage of pressurized fluid from the pressure generator 402 through the pressurization passage 408 but substantially prevents the opposed delivery of propellant 104 through the pressurization passage 408 to the pressure generator 402.

Figure 5:
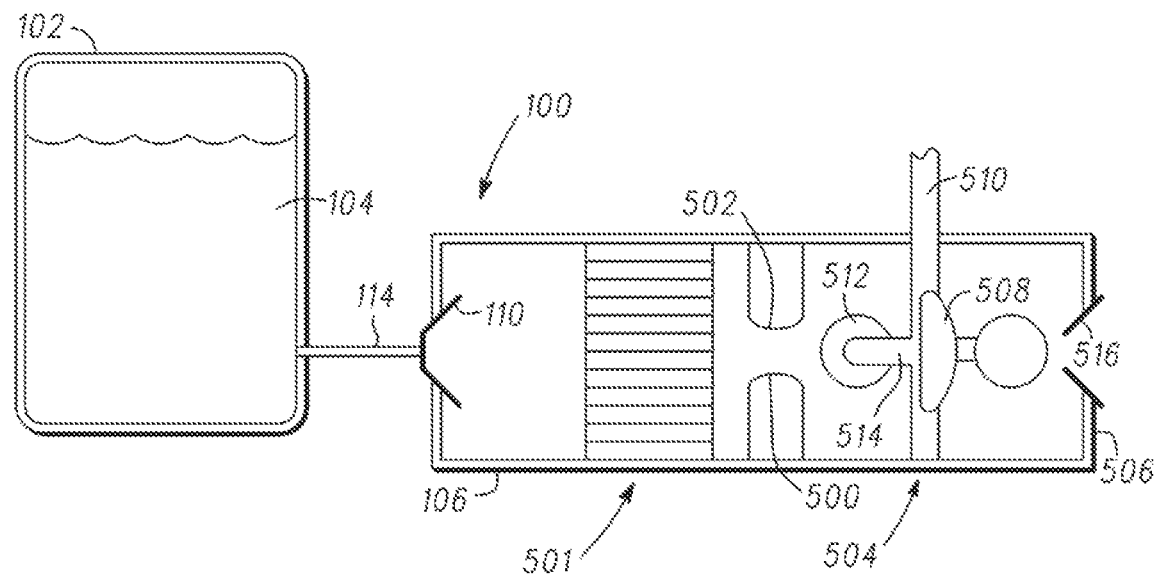
FIG. 5 is a schematic view of the gas generator of FIG. 1 coupled with one example of an impulse turbine within a turbine housing.

FIG. 5 shows a schematic view of the gas generator assembly 100 previously described in FIG. 1 coupled with one example of an impulse turbine assembly 504. The gas generator assembly 100 in combination with the impulse turbine assembly 504 is one example of a micro power unit 501. As previously described, the gas generator assembly 100 includes a propellant chamber 102 including a propellant 104 therein, such as an amine based propellant, coupled with a reaction chamber 106 having a porous reaction matrix 108. As shown in FIG. 5, the reaction chamber 106 includes a discharge nozzle 500 having a nozzle contour 502. Optionally, the discharge nozzle 500 includes a rocket nozzle including a corresponding nozzle contour 502 configured to direct exhaust gases generated from the porous reaction matrix 108 at high velocity (e.g., supersonic) into the impulse turbine assembly 504. For instance, the nozzle contour 502 accelerates exhaust gases and discharges the gases from the reaction chamber 108 at velocities of around 5000 to 7000 feet per second.

Referring again to FIG. 5, the impulse turbine assembly 504 is shown coupled with the reaction chamber 106 and in fluid communication through the discharge nozzle 500. The impulse turbine 504 assembly includes a turbine housing 506 with a turbine rotor 508 therein. In one example, the turbine rotor 508 is a radial impulse turbine including for instance, a Pelton wheel. The turbine rotor 508 is rotatably movable within the turbine housing 506 through coupling with a turbine shaft 510 extending through the turbine housing 506. As shown in FIG. 5, the turbine rotor 508 includes a plurality of tangential cups 512 positioned adjacent to the discharge nozzle 500. Stated another way, the discharge nozzle 500 is configured to direct exhaust gases into tangential cups 512 and thereby rotate the turbine rotor 508 relative to the turbine housing 506. The turbine housing 506 further includes an exhaust discharge 516 configured to release exhaust gases from within the turbine housing 506 after the exhaust gases impinge upon the tangential cups 512 and transmit kinetic energy into rotation of the turbine rotor 508 and the turbine shaft 510.

Figure 6:
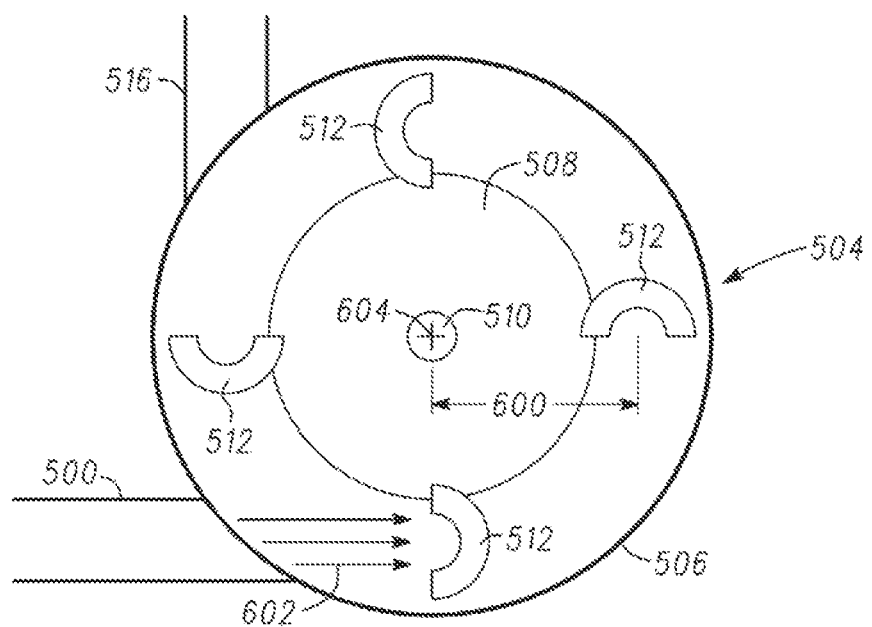
FIG. 6 is a top view of the impulse turbine and the turbine housing of FIG. 5.

Referring now to FIG. 6, the impulse turbine assembly 504 shown in FIG. 5 is now shown from the top. The turbine rotor 508, for instance a Pelton wheel, is rotatably positioned within the turbine housing 506. As shown the turbine rotor 508 includes a plurality of tangential cups 512 positioned along the periphery of the turbine rotor 508. The plurality of tangential cups 512 are positioned to ensure tangential impingement by exhaust streams 602 delivered through the discharge nozzle 500 along the periphery of the rotor 508. In one example, the plurality of tangential cups 512 are positioned at a consistent radius 600 relative to a center axis of the turbine shaft 510. For instance, the plurality of tangential cups 512 are positioned at approximately 0.5 inches from the center axis of the turbine shaft 510. With the plurality of tangential cups 512 positioned at radii of approximately 0.5 inches relative to the center axis 604 of the turbine shaft 510 the impulse turbine assembly 504 has a diameter of around 1 inch (or more with the housing 506 included).

As will be described in detail below, because the turbine rotor 508 relies on the impulse provided by the exhaust stream 602 from the reaction chamber 106 a high velocity stream of exhaust gas generates significant power generation with the impulse turbine assembly 504 without requiring high volumetric flow rate. Correspondingly, when the exhaust stream 602 from the discharge nozzle 500 enters the impulse turbine assembly 504 at supersonic velocity, for instance, 5000 to 7000 feet per second the corresponding rotational speed of the turbine rotor 508 generates significant power despite the miniaturized and compact form factor of the micro power unit 501 including the gas generator assembly 100 and the impulse turbine assembly 504. Stated another way, the impulse turbine assembly 504 relies on high velocity and low volumetric flow rates to achieve significant power while other turbines such as radial turbines rely on high volumetric flow rate with low velocity to generate power. High volumetric flow rates correspondingly require large nozzles, significant propellant storage and the like that facilitate the delivery of large quantities of fluid into the turbine housing. Relatively large axial turbines are required to generate power with the corresponding high volumetric flow rates. Large turbines, large nozzles and greater propellant storage (relative to the micro power unit 501) preclude the miniaturization of turbine assemblies and thereby correspondingly preclude the use of axial turbines in a miniaturized assembly such as the gas generator assembly 100 described herein.

As previously described, the impulse turbine assembly 504 shown in FIGS. 5 and 6 relies on a high velocity stream of exhaust gas 602 delivered from the discharge nozzle 500 and generated within the reaction chamber 106 by catalyzing an amine based propellant 104 within the porous reaction matrix 108. The impulse turbine assembly 504 relies principally on the high velocity for power generation as opposed to the volumetric flow rate of the stream of gas passing into the turbine housing 506 and impinging upon the tangential cups 512. The force delivered by the exhaust stream 602 to the tangential cups 512 rotates the turbine rotor 508 and correspondingly rotates the turbine shaft 510 to thereby generate mechanical power for the micro power unit 501. In one example, the force imposed by the exhaust stream 602 on one or more of the tangential cups 512 is represented by the following equation:

$$F=2\rho Q(V_i-u)$$

In the equation F stands for the force on each of tangential cups 512 due to impinging of the exhaust stream 602 thereon. The Greek letter ρ is the density of the exhaust stream 602 fluid. Q is the volumetric flow rate of the exhaust gas into the turbine housing 506 while $V_i$ is the initial velocity of the exhaust stream 602 as it enters the turbine housing 506. The quantity u is equivalent to the linear speed of a point on the turbine rotor 508 at an identical radius to the tangential cups 512. As shown in the force equation, the force delivered to the turbine rotor 508 is at least partially generated according to the volumetric flow rate of the exhaust stream 602 delivered into the impulse turbine assembly 504. As will be described in further detail below there is a stronger relationship between the velocity of the exhaust stream 602 relative to the power generated by the pulse turbine assembly 504. The power generated by the impulse turbine assembly 504 is represented by the following equation:

$$P=Fu$$

As previously described, the force equation is provided above and the quantity u is equivalent to the linear speed of a point on the turbine rotor 508 equal distance from the center of axis 604 of the turbine shaft 510 to one of the tangential cups 512 (e.g., equivalent to the radius of the turbine rotor 508). The resulting equation for power is:

$$P=2\rho Q(V_i-u)(u)$$

The derivative of the resulting equation is thereafter taken to find a maximum power capable of being delivered by the impulse turbine assembly 504. The derivative of the equation is set equal to zero and u is solved for. By setting the derivative equal to zero and solving for u the velocity that achieves maximum power is determined (e.g., maximum power occurs where the change in power over time is equal to zero at the peak of the curve). By setting the derivative equal to zero and then solving for u maximum power is generated with the impulse turbine assembly where u is equal to:

$$u = \frac{V_i}{2}$$

As shown above, the velocity of the turbine rotor 508 is a function of $V_i$, the exhaust stream 602 velocity. Returning to the previously determined power equation for the impulse turbine assembly 504, when the quantity u is exchanged for the velocity based value determined above ($V_i/2$) the power equation is solved and is equivalent to:

$$P_{max} = \rho Q \frac{V_i^2}{2}$$

$$P_{max} = \rho A \frac{V_i^3}{2}$$

As shown above, when the volumetric flow rate Q is exchanged for its components, the area of the discharge nozzle 500 and the incoming velocity of the exhaust stream 602, the power equation shows that there is a cubic relationship between the inlet velocity of the exhaust stream 602 (e.g., $V_i$) and the power. That is to say, by providing a high velocity exhaust stream 602 to the impulse turbine assembly 504 the velocity of the exhaust stream 602 has an exponential cubic relationship to the power generated by the impulse turbine assembly 504. In contrast, the area of the discharge nozzle 500 (one component of the volumetric flow rate) has a simple multiplicative relationship to the power generated by the impulse turbine assembly 504. Stated another way, by maximizing the velocity of the exhaust stream 602 and minimizing the volumetric flow rate through the discharge nozzle 500 significant power is generated by the impulse turbine assembly 504 compared to corresponding increases in the volumetric flow rate of the exhaust stream 602 and a corresponding decrease in the exhaust stream velocity.

Figure 7:
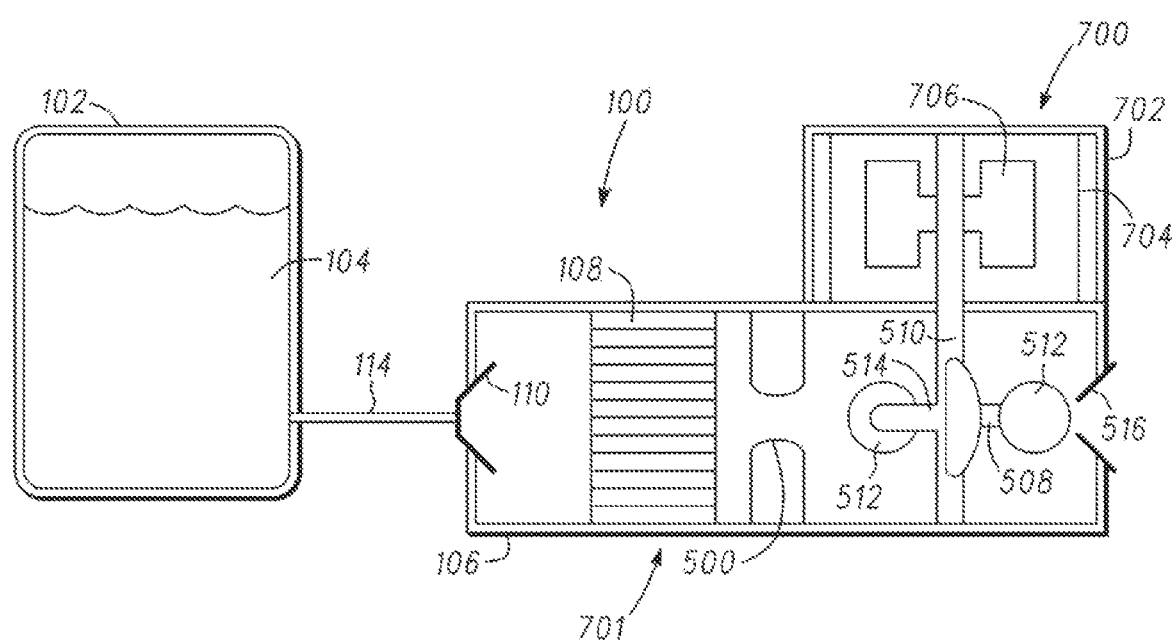
FIG. 7 is a schematic view of the gas generator of FIG. 1 coupled with an electric generator.

FIG. 7 shows another example of the gas generator assembly 100 coupled with the impulse turbine assembly 504 previously shown in FIGS. 5 and 6 and an electric generator 700.

The assembly of the gas generator 100, the impulse turbine assembly 504 and the electric generator 700 is another example of a micro power unit 701 configured to generator one or more of electrical and mechanical power. As previously described, the exhaust stream 602 (see FIG. 6) is delivered to the impulse turbine assembly 504 to turn the turbine rotor 508 and thereby rotate the turbine shaft 510. In one example, the turbine shaft 510 is coupled, for instance via a reduction drive, with mechanical components in another assembly such as a miniature unmanned air vehicle. In the example shown in FIG. 7, the turbine shaft 510 is coupled with the electric generator 700 (e.g., an alternator). As shown in FIG. 7, the electric generator 700 includes a generator housing 702 having a stator 704 in the housing 702 surrounding a generator rotor 706. Rotation of the turbine rotor 508 and turbine shaft 510 is correspondingly transmitted to the generator rotor 706. Rotation of the generator rotor 706 generates electricity in the stator 704.

As previously described, the exhaust stream 602 is delivered to the impulse turbine assembly 504 at a high velocity, for instance, 5000 to 7000 feet per second. The power generated by the impulse turbine assembly 504 is equivalent to an exponent of the inlet velocity ($V_j$) of discharge nozzle 500. The inlet velocity of discharge nozzle 500 has a relationship to the rotational speed of the turbine shaft 510. For instance, as previously described, when solving for the maximum power capable of being generated by the impulse turbine assembly 504 the velocity of a point on the turbine rotor 508 equivalent to radius of a tangential cup 512 is equal to u and u is equal to the quantity $V_j/2$. The velocity u divided by the radius of the tangential cups 512 provides the rotational speed of the turbine shaft 510. The generator rotor 706 is rotated at this rotational speed ($\omega$) and the electric generator 700 correspondingly generates electricity according to the speed of the generator rotor 706 rotation. Stated another way, the greater the exhaust stream velocity 602 the greater the rotational speed of the generator rotor 706. Accordingly, increasing the rotational speed of the electric generator 700 generates increased electricity. As will be described in further detail below, the electricity generated through the electric generator 700 in combination with the impulse turbine assembly 504 (as the micro power unit 701) is used in one or more applications to provide electricity for a flight control system in a miniature unmanned air vehicle, rotation of a propeller for an unmanned air vehicle, for charging of batteries and the like.

Figure 8:
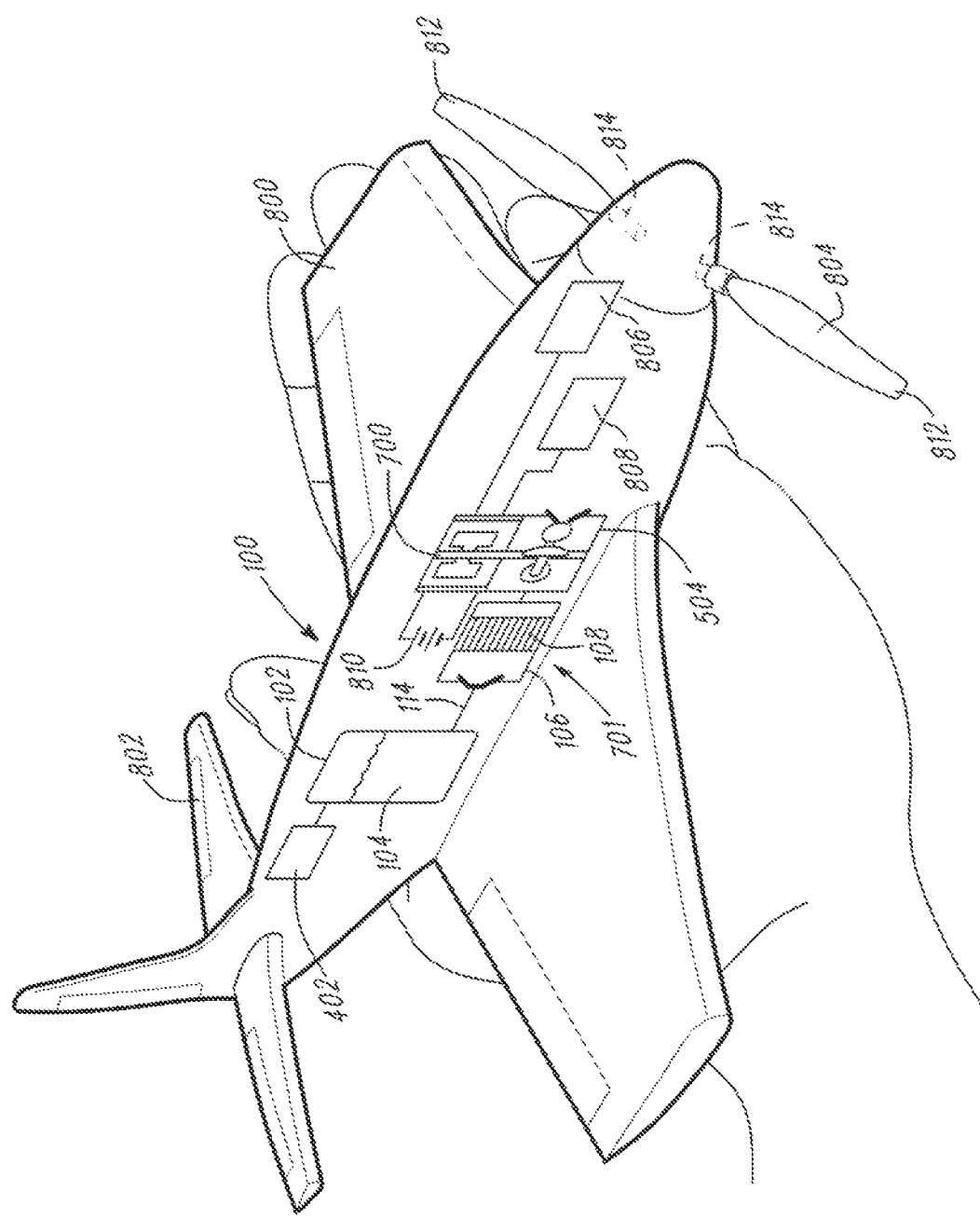
FIG. 8 is a perspective view of one example of a miniaturized unmanned air vehicle including the non-combusting gas generator of FIG. 1 and the electric generator of FIG. 6.

FIG. 8 shows one example of a miniaturized unmanned air vehicle (UAV) including the gas generator assembly 100 as part of the micro power unit 701 previously described herein. As shown in FIG. 8, the miniaturized UAV 800 includes a UAV body 802 having a fuselage and wings attached to the fuselage. As shown in FIG. 8, in one example, the miniaturized UAV 800 includes a UAV propeller 804 rotatably coupled with the UAV body 802. In one example, the UAV propeller 804 includes adjustable blades 812. The adjustable blades 812 are operated with attached blade actuators 814 to adjust the pitch of the adjustable blades 812 during operation of the miniaturized UAV 800.

Referring now to the schematic view of the micro power unit 701 and the other components within the miniaturized UAV 800, the gas generator assembly 100 includes a propellant chamber 102 including a propellant 104 therein. In one example, the propellant 104 includes a non-combustible propellant such as an amine based propellant (e.g., hydroxyl ammonium nitrate). In the example shown in FIG. 8, the propellant chamber 102 is coupled with a pressure generator 402 configured to apply a pressure through the propellant chamber 102 and thereby deliver the propellant 104 through the propellant passage 114 to a reaction chamber 106 including a porous reaction matrix 108. As previously described, the porous reaction matrix 108 includes a catalyst therein configured to catalyze the propellant 104 and non-combustibly generate exhaust gases such as nitric oxide, nitrous oxide, oxygen and the like. The exhaust gases are delivered through the reaction chamber 106 to the impulse turbine assembly 504 shown in FIG. 8. As previously described in one example, the impulse turbine assembly 504 includes a Pelton wheel such as the turbine rotor 508 shown in FIG. 5. The impulse turbine assembly 504 further includes a turbine shaft 510 (see FIG. 5) coupled with the electric generator 700. Rotation of the turbine rotor correspondingly rotates the generator rotor 706 (see FIG. 7) and thereby generates electricity for the miniaturized UAV 800.

In the example shown in FIG. 8, multiple components are shown electrically coupled with the electric generator 700. For instance, the electric generator 700 is shown coupled with a flight control system 808. The generator 700 provides electrical power for the flight control system 808 and facilitates the control of the miniaturized UAV 800. In another example, the miniaturized UAV 800 includes a battery 810 coupled with the electric generator 700. During operation of the gas generator assembly 100, electricity generated by the electric generator 700 is optionally stored within the battery 810 for future use by the miniaturized UAV 800. In one example, the gas generator assembly 100 is operated over a specified period of time and the electricity generated by the electrical generator 700 is thereafter stored within the battery 810 for use during the part of or for the entire operational stage of the miniaturized UAV 800. The inclusion of the gas generator assembly 100 facilitates the use of a smaller battery 810 relative to larger batteries otherwise needed for operation of the miniaturized UAV 800 that are configured to retain their charge for extended shelf lives, for instance, 5 to 10 years.

In another example, the electric generator 700 is shown coupled with a motor 806 mechanically coupled to the UAV propeller 804. As shown in FIG. 8, the electric power generated through the electric generator 700 is transmitted to the motor 806 to rotate the UAV propeller 804 and thereby provide motive power to the miniaturized UAV 800. In another example, the flight control system 808 is operatively coupled with the UAV propeller 804, for instance, the adjustable blades 812. The flight control system 808 is configured to operate the blade actuators 814 and thereby adjust the pitch of the blades 812. The flight control system 808 is able to adjust the power consumption of the UAV propeller 804 and correspondingly adjust the overall speed of the miniaturized UAV 800. In another example, the flight control system 808 is configured to selectively deliver power to one or more of the UAV propeller 804 and the battery 810 according to the operational needs of the miniaturized UAV 800 at discrete times during the operation of the UAV. For instance, during operation of the gas generator assembly 100 the flight control system 808 selectively delivers electrical energy from the electric generator 700 to the UAV propeller 804 where the flight control system 808 determines that the UAV propeller 804 needs the entirety of the power generated through the micro power unit 701 to achieve performance parameters, for instance, maximum speed, thrust and the like. In another example, where the flight control system 808 determines that the UAV propeller 804 and the motor 806 do not at a particular time require all of the power generated by the micro power unit 701 the flight control system 808 diverts at least some of the electrical power generated by the electric generator 700 to the battery 810 for storage and eventual use by the UAV the motor 806 (and other systems of the UAV).

In another example, the flight control system 808 cooperates with the micro power unit 701 (including the gas generator assembly 100) to throttle the flow of propellant 104 from the propellant chamber 102 to the reaction chamber 106 and the porous reaction matrix 108. By throttling the flow of the propellant 104 to the reaction chamber 106 propellant is delivered and catalyze in a controlled and specified manner to ensure appropriate power output is generated by the impulse turbine assembly 504 coupled with the electric generator 700. For instance, in one example, the flight control system is operatively coupled with the propellant control valve 212 shown in FIG. 2. The propellant control valve 212 includes a needle valve configured to precisely meter the amount of propellant 104 delivered to the reaction chamber 106. By metering the propellant 104 delivered to the porous matrix 108 the gas generator assembly 100 in cooperation with the flight control system 808 is able to adjust the output of exhaust gases to the impulse turbine assembly 504 and the corresponding rotational speed of the turbine rotor 508 and the generator rotor 706. The electric power output of the micro power unit 701 including the turbine assembly 504 and the electric generator 700 is thereby adjusted as needed according to the power needs of the miniaturized UAV 800.

In still another example, the flight control system 808 is operatively coupled with the blade actuators 814. The flight control system 808 adjusts the aerodynamic characteristics of the UAV propeller 804 by adjusting the pitch of the adjustable blades 812. For instance, as the gas generator assembly 100 operates by delivering the propellant 104 to the reaction chamber 106 a set amount of power is generated over a unit time by the electric generator 700. The flight control system 808 adjusts the pitch of the adjustable blades 812 through operation of the blade actuators 814 to correspondingly adjust the overall speed of the miniaturized UAV 800.

The miniaturized UAV 800 including the micro power unit 701 (incorporating the gas generator assembly 100 and other components) as shown in FIG. 8 provides significant operational advantages over similarly designed UAVs including battery systems. For instance, the gas generator assembly 100 includes a stable propellant 104, such as an amine based propellant (e.g., hydroxyl ammonium nitrate), that has a long shelf life and is substantially non-combustible. The use of a gas generator assembly 100 including the propellant 104 thereby substantially eliminates the hazards attendant with using a combustible propellant. Additionally, the operation of the gas generator assembly 100, for instance, during operation of the miniaturized UAV 800 decreases the mass of the miniaturized UAV 800 over the span of time the propellant 104 is delivered to the reaction chamber 106. For instance, as the propellant 104 is catalyzed within the porous reaction matrix 108 and the exhaust gases are delivered to the impulse turbine assembly 504 the mass of the propellant 104 gradually decreases. The overall mass of the miniaturized UAV 800 thereby correspondingly decreases which facilitates a more efficient operation of the miniaturized UAV as the electric motor 806 and UAV propeller 804 operate to move a UAV body 802 having a gradually decreasing weight.

Additionally, the gas generator assembly 100 in combination with the impulse turbine assembly 504 and the electric generator 700 allows for the electrical coupling of the gas generator assembly 100 with the motor 806 of the UAV propeller 804. In another example, the impulse turbine assembly 504 is mechanically coupled with the UAV propeller 804, for instance with a reduction drive interposed therebetween. Further, as described above, the flight control system 808 is able to selectively throttle the power output of the gas generator assembly 100 through operation of the blade actuators 814 coupled with the adjustable blades 812. By adjusting the pitch of the blades 812 the flight control system 808 is able to change the aerodynamic characteristics of the adjustable blades 812 and thereby correspondingly alter the overall speed and performance of the miniaturized UAV 800. In another example, and as previously described, the flight control system 808 is configured to throttle the flow of the propellant 104 to the reaction chamber 106, for instance, with a propellant control valve 212 shown in FIG. 20. The flight control system 808 in this configuration is able to control the output of exhaust gases the from reaction chamber 106 to the impulse assembly 504 and thereby correspondingly adjust and manage the electrical power output of the electric generator 700. The electric generator 700 thereby produces an adjustable range of output power to the UAV propeller 804 and motor 806 to correspondingly adjust the overall speed and performance of the miniaturized UAV 800.

Moreover, the micro power unit 701 included with the miniaturized UAV 800 provides a complete power generating assembly that is fully self-contained and does not require ambient air for operation. Instead the non-combustible gas generator assembly 100 catalyzes the amine based propellant 104 within the porous reaction matrix 108 and the catalyzation generates the exhaust gases needed for operation of the impulse turbine assembly 504. Further, the catalyzation of the propellant 104 within the porous reaction matrix 108 generates exhaust gases at high velocity, for instance 5000 to 7000 feet per second. The exhaust gases when delivered through the discharge nozzle 500 impinge upon the tangential cups 512 of the turbine rotor 508 to correspondingly rotate the turbine rotor 508 and the attached generator rotor 706 to generate power. The micro power unit 701 is thereby able to operate in almost any environment (e.g., sea level atmosphere, thin atmosphere environments, for instance the exosphere and thermosphere and the like) and does not need additional compressors, inlets for air and fuel and the like with the accompanying weight and structure. Stated another way, the micro power unit 701 included in the miniaturized UAV 800 operates as a closed system and thereby does not need ambient air or other sources of fuel mixed with the propellant 104 for operation. Instead the gas generator assembly 100 by itself non-combustibly generates exhaust gases and cooperates with the impulse turbine assembly 504 and the electric generator 700 to correspondingly generate power.

Figure 9:
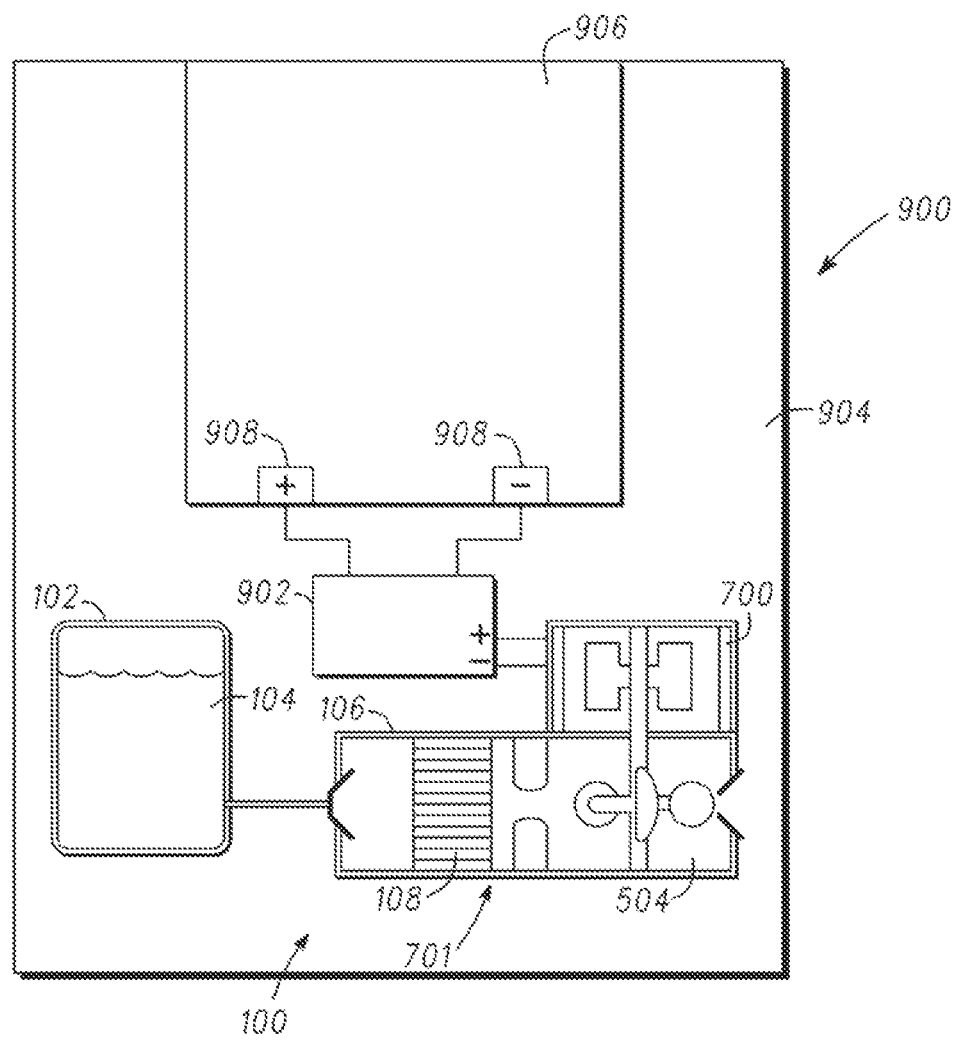
FIG. 9 is a side/perspective view of one example of a battery charger including the non-combusting gas generator of FIG. 1 and the electric generator of FIG. 7.

FIG. 9 shows one example of a battery charger 900 including the gas generator assembly 100 previously described herein. As shown in FIG. 9, the battery charger 900 further includes an impulse turbine assembly 504 and an electric generator 700 coupled with a gas generator assembly 100 (as the micro power unit 701). The battery charger 900 further includes a charger housing 904 containing the gas generator assembly 100, the impulse turbine assembly 504 and the electric generator 700. The charger housing 904 further includes a battery receptacle 906 sized and shaped to receive at least one battery therein. As shown in FIG. 9, two or more terminals 908 are positioned within the battery receptacle 906 and configured to make contact with at least one battery positioned within the battery receptacle 906. As further shown in FIG. 9, in one example, a regulator 902 (e.g., one or more of a voltage or a current regulator) is interposed between the terminals 908 and the electric generator 700. The regulator 902 is configured to condition electricity generated by the electric generator 700 for recharging of one or more batteries positioned within the battery receptacle 906. In one example, and further described below, the regulator 902 is an adjustable regulator and configurable to recharge one or more of a variety of different battery types. Optionally, in another example, the regulator 902 includes a series of regulators positioned within the charger housing 904 each of which is selectively adjustable to supply a desired voltage or current to the terminals 908 of the battery charger 900. For instance, where the battery charger 900 includes a plurality of battery receptacles 906, a plurality of regulators 902 are used to selectively determine what voltage and current combination delivered to each of the terminals 908.

As previously described, the gas generator assembly 100 operates by delivering a propellant, such as the propellant 104, in the propellant chamber 102 to a reaction chamber 106 including a porous reaction matrix 108. The propellant 104 includes, but is not limited to, hydroxyl ammonium nitrate, a non-combustible propellant catalyzed by the catalyst 204 within the porous reaction matrix 108 to generate one or more exhaust gases. The non-combustibly generated exhaust gases are delivered to the impulse turbine assembly 504. As previously described in one example, the exhaust gases are delivered to the impulse turbine assembly 504 at high velocity, for instance, 5000 to 7000 feet per second (e.g., a supersonic velocity). The exhaust gases impinge upon the tangential cups 512 of the turbine rotor 508 and turn the turbine rotor and the associated turbine shaft 510. Rotation of the turbine shaft correspondingly operates the electric generator 700 and generates electricity for the battery charger 800.

As shown in FIG. 9, the battery charger 900 includes a regulator 902 configured to adjust the electrical output of the electric generator 700 according to the voltage and current specifications of any battery configured for positioning within the battery receptacle 906. Optionally, the regulator 902 is an adjustable regulator and the user is able to select the voltage and current combination according to the battery to be recharged within the battery receptacle 906. In yet another example, the battery charger 900 includes a plurality of battery receptacles 906 sized and shaped to receive a corresponding plurality and variety of batteries therein. One or more regulators 902 are included in the battery charger 900. The one or more regulators 902 either include set regulator schemes or variable regulator schemes according to the batteries positioned within the multiple battery receptacles 906.

The battery charger 900 including the non-combusting gas generator assembly 100 shown in FIG. 9 provides a number of advantages over battery operated battery chargers. In one example, the battery charger 900 includes a stable long lasting power source with the propellant 104. The propellant 104, for instance an amine based propellant, has a long shelf life (e.g., 10 years or longer). Additionally, the amine based propellant 104 is stable and not subject to combustion or gradual decay while stored. The battery charger 900 further allows a user to effectively recharge batteries in the field. As described above, the battery charger 900 has a long shelf life with a stable non-hazardous propellant 104 therein. A user may carry the battery charger 900 in the field and confidently use the battery charger 900 after months or even years in the field or storage before actual use. The battery charger 900 is used to recharge rechargeable batteries and provides a stable platform that the user can rely on to confidently recharge the batteries while in the field.

The micro power unit 701 included with the battery charger 900 provides a complete power generating assembly that is fully self-contained and does not require ambient air for operation. Instead the non-combustible gas generator assembly 100 catalyzes the amine based propellant 104 within the porous reaction matrix 108 and the catalyzation generates the exhaust gases needed for operation of the impulse turbine assembly 504 and the electric generator 700 coupled with the turbine assembly. The micro power unit 701 is thereby able to operate in almost any environment (e.g., sea level atmosphere, thin atmosphere environments, for instance the exosphere and thermosphere and the like) and does not need additional compressors, inlets and the like (with additional mechanical structure) to mix ambient air or other fuels with the propellant. Stated another way, the micro power unit 701 included in the battery charger 900 operates as a closed system and thereby does not need ambient air or other sources of fuel mixed with the propellant 104 for operation. Instead the gas generator assembly 100 by itself non-combustibly generates exhaust gases and cooperates with the impulse turbine assembly 504 and the electric generator 700 to correspondingly generate power.

Figure 10:
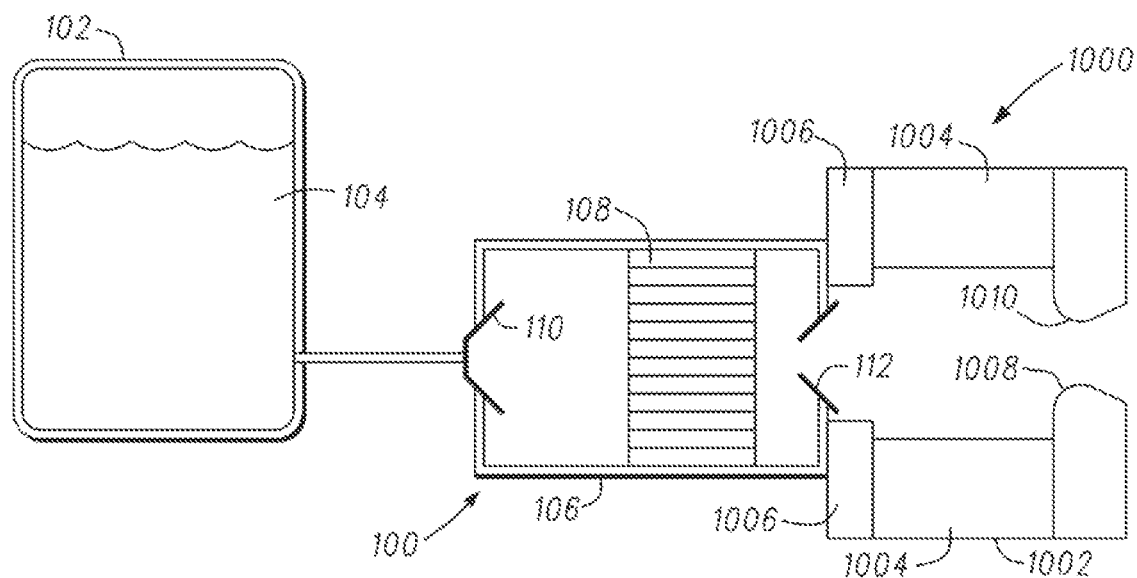
FIG. 10 is a schematic diagram of one example of a rocket motor coupled with the non-combusting gas generator of FIG. 1.

FIG. 10 shows one example of a rocket motor 1000 coupled with the non-combustible gas generator assembly 100 shown in FIG. 1. In the example shown in FIG. 10, the rocket motor 1000 includes a rocket housing 1002 including a fuel 1004, such as a solid rocket propellant, positioned along the rocket housing 1002. The rocket motor 1000 further includes an initiator 1006 positioned within the rocket housing 1002. The initiator 1006 is configured to initiate a combustion reaction within the rocket housing 1002, for instance, with exhaust gases generated by the reaction chamber 106. The rocket motor 1000 further includes a rocket discharge nozzle 1008 having a nozzle contour 1010. In one example, the rocket discharge nozzle 1008 includes a nozzle contour 1010 configured to funnel and direct exhaust gases from the rocket motor 1000 out of the rocket housing 1002 according to a desired thrust and performance profile for the rocket motor 1000.

As previously described, the non-combustible gas generator assembly 100 operates by delivering a propellant 104 from a propellant chamber 102 through an injector 110 into the reaction chamber 106. As previously described, the propellant 104 in one example is a non-combustible amine based propellant delivered to the porous reaction matrix 108 within the reaction chamber 106. The introduction of the propellant 104 to the porous reaction matrix 108 catalyzes the propellant 104 and generates a exhaust gases. The exhaust gases are thereafter delivered through the discharge nozzle 112 of the reaction chamber 106. In one example, the exhaust gases include oxygen generated from the catalyzation of the propellant 104. In another example, the propellant 104 includes, but is not limited to, hydroxyl ammonium nitrate (HAN) while the catalyst within the porous reaction matrix 108 includes the catalyst 204 (e.g., platinum). The catalyst 204 rapidly catalyzes the propellant 104 to generate exhaust gases including, but not limited to, nitrous oxide, nitric oxide and oxygen (e.g., $O_2$). Where the reaction chamber 106 including the porous reaction matrix 108 and the propellant 104 generate oxygen, the oxygen is delivered through the discharge nozzle 112 into the rocket motor 1000. In one example, the oxygen exhaust delivered to the rocket motor 1000 is delivered at high pressure and high temperature, for instance, 1200° F. The high temperature exhaust gases including oxygen are delivered into the rocket housing 1002 and mixed with the fuel 1004. The initiator 1006 thereafter operates the rocket motor by initiating a combustion reaction between the fuel 1004 mixed with oxygen. The resulting combustion reaction generates rocket exhaust gases that are directed through the rocket discharge nozzle 1008. The rocket exhaust gases directed through the rocket discharge nozzle 1008 are accelerated according to the nozzle contour 1010 and thereby generate a desired thrust profile.

The assembly of the rocket motor 1000 with the non-combustible gas generator assembly 100 thereby provides a complete rocket assembly including oxygen generated by the gas generator assembly 100 and routed to the rocket housing 1002 for combustion with the fuel 1004. The rocket motor 1000 thereby includes a fully self-contained system that does not require ambient air for operation. Instead the non-combustible gas generator assembly 100 catalyzes the amine based propellant 104 within the porous reaction matrix 108 and the catalyzation generates the oxygen needed for operation of the rocket motor 1000. Further, the catalyzation of the propellant 104 within the porous reaction matrix 108 generates exhaust gases at relatively high temperatures, for instance, 1200° F. The exhaust gases when delivered through the discharge nozzle 112 act to preheat the rocket motor 1000 and thereby assist in initiation of the fuel 1004 in combination with the initiator 1006. The rocket motor 1000 is thereby able to operate in almost any environment (e.g., sea level atmosphere, thin atmosphere environments, for instance the exosphere and thermosphere as well as vacuum environments and the like). Stated another way, the rocket motor 1000 operates as a closed system and thereby does not need ambient air or other sources of fuel for mixture with the fuel 1004 for operation. Instead the gas generator assembly 100 provides the oxygen needed for the fuel 1004 to initiate a combustion reaction within the rocket housing 1002 to operate the rocket motor 1000 and generate exhaust gases deliverable through the rocket discharge nozzle 1008.

Figure 11:
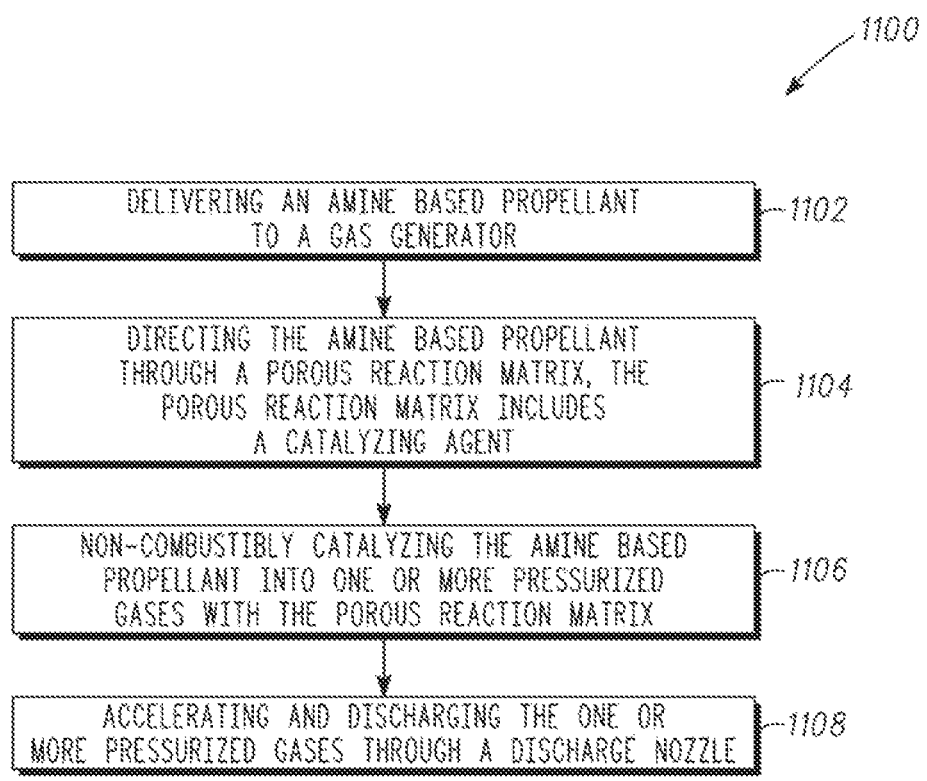
FIG. 11 is a block diagram showing one example of a method for using a gas generator.

FIG. 11 shows one example of a method 1100 for using a gas generator such as the non-combustible gas generator 100 shown in FIG. 1. Reference is made in description of the method 1100 to various features and elements previously described herein. Where appropriate, reference numbers are provided in the description of the method 1100. Reference numbers are not intended to be limiting. Instead, any reference to a particular element or feature is intended to include references to all similar components described herein as well as their equivalents. At 1102, the method 1100 includes delivering an amine based propellant (e.g., hydroxyl ammonium nitrate) to a gas generator, such as a reaction chamber 106 shown in FIG. 1. As previously described above in one example, the propellant 104 is delivered to the reaction chamber 106 from a propellant chamber 102. For instance, the propellant 104 is pressurized through the introduction of a pressurized fluid (e.g., gas) generated by a pressure generator 402, for instance shown in FIG. 4.

At 1102, the amine based propellant 104 is directed through a porous reaction matrix 108. The porous reaction matrix 108 includes a catalyzing agent such as the catalyst 104 (e.g., platinum) shown in FIG. 2. At 1106, the amine based propellant 104 is non-combustibly catalyzed into one or more pressurized exhaust gases with the porous reaction matrix 108 having the catalyst 204 disposed therein. In one example, non-combustibly catalyzing the amine based propellant 104 includes non-combustibly catalyzing the propellant 104 in a closed system. For instance, the porous reaction matrix 108 and the amine based propellant 104 are isolated from ambient air and other sources of fuel. As shown for instance in FIG. 1, the gas chamber assembly 100 is a substantially closed system wherein the propellant 104 is delivered, for instance through an injector 110, to the porous reaction matrix 108 for catalyzation by the catalyst 204 disposed within the porous reaction matrix 108. The closed catalyzation within the porous reaction matrix 108 generates exhaust gases including, but not limited to, nitrous oxide, nitric oxide and oxygen.

At 1108, the exhaust gases generated by the catalyzation of the propellant 104 within the porous reaction matrix 108 are accelerated and discharged through a discharge nozzle such as the discharge nozzle 112 shown in FIG. 1. In one example, the exhaust gases are accelerated and discharged from the discharge nozzle 500 (see FIG. 5) at supersonic velocity (e.g., 5000 to 7000 feet per second).

Several options for the method 1100 follow. In one example, the method 1100 includes preheating the porous reaction matrix 108 with a preheating substrate such as the preheater assembly 206 shown in FIG. 2. In one example, the preheating assembly 206 preheats the porous reaction matrix 108 including the catalyst 204 therein to a specified threshold temperature configured to ensure the complete catalyzation of the propellant 104 introduced into the reaction chamber 108 delivered through the porous reaction matrix. For instance, the preheating assembly 206 preheats the porous reaction matrix 108 to a temperature of approximately 260 degrees Celsius to 1100 degrees Celsius. In one example, preheating of the porous reaction matrix 108 includes delivering a preheating pulse of the amine based propellant 104 to the preheating substrate such as the preheater 208 shown in FIG. 2. In one example, the preheater 208 includes a hypergolic substance disposed within a substrate coupled across the porous reaction matrix 108. The method 1100 further includes reacting the amine based propellant 104 with the hypergolic substance to produce heat. The heat generated by the preheater 208 is conducted to the porous reaction matrix 108 coupled with the preheater 208. In still another example, the method 1100 includes measuring the temperature of the porous reaction matrix 108 against the temperature threshold (for instance, a threshold of approximately 260 to 1100 degrees Celsius). The method 1100 further includes delivering a catalyzing stream of the amine based propellant 104 to the porous reaction matrix 108 if the measured temperature meets or exceeds the temperature threshold. As shown in FIG. 2A, in one example, the preheating assembly 206 includes a temperature sensor 210 coupled with the porous reaction matrix 108. The temperature sensor 210 is coupled with a propellant control valve 212 that meters the flow of propellant 104 into the reaction chamber 106. The previously described preheating pulse is delivered through the propellant control valve 212 where the propellant control valve is partially closed and thereby configured to deliver a small stream of the propellant 104 to the porous reaction matrix 108 and the preheater 208 coupled over the porous reaction matrix. After operation of the preheater 208, the temperature sensor 210 monitors the temperature of the porous reaction matrix 108 and opens the propellant control valve 212 when the temperature of the porous reaction matrix 108 meets or exceeds the threshold temperature needed for a desired catalyzation of the propellant 104 within the porous reaction matrix 108.

In another example, accelerating and discharging the one or more pressurized gases for instance, the exhaust gases generated through catalyzation of the propellant 104 by the porous reaction matrix 108 includes discharging the one or more pressurized gases against an impulse turbine, for instance, a turbine rotor 508 within a turbine housing 506 of a turbine assembly 504 shown in FIG. 5. In one example, the turbine rotor 508 includes a plurality of tangential cups 512 where the turbine rotor 508 is configured as a Pelton wheel (e.g., an impulse turbine). As previously described, the exhaust gases discharged through the discharge nozzle 500 shown in FIG. 5 are delivered in a tangential manner to the tangential cups 512 to rotate the turbine rotor 508 and thereby correspondingly rotate the turbine shaft 510. Rotation of the turbine shaft 510 is configured to generate mechanical power through the rotation of the shaft as well as electrical power where the turbine shaft 510 is coupled with an electric generator, such as the generator 700 shown in FIG. 7. In one example, the method 1100 includes throttling power generated from the impulse turbine (e.g., mechanical power or electrical power in the case of generator 700) through throttling delivery of the amine based propellant 104 to the reaction chamber 106. For instance, the propellant control valve 212 shown in FIG. 2 is operated according to, for instance, a flight control system, such as the system 808 shown in FIG. 8 within a miniaturized UAV 800, to adjust one or more of the mechanical or electrical power generated by the gas generator assembly 100 in combination with one or more of the impulse turbine assembly 504 and the electric generator 700.

In yet another example, the method 1100 includes discharging the one or more pressurized gases such as the exhaust gases generated by the catalyzation of the propellant 104 by the porous reaction matrix 108 through a rocket motor 1000. Referring to FIG. 10, the rocket motor 1000 includes a fuel 1004 such as a solid fuel configured to mix with the exhaust gases including for instance, oxygen. The rocket motor 1000 further includes an initiator 1006 to initiate a combustion reaction between the oxygen and the fuel 1004 and generate thrust by delivering rocket exhaust gas through a rocket discharge nozzle 1080.

CONCLUSION

In accordance with some embodiments, the non-combusting gas generator described herein provides an assembly configured to generate a source of exhaust gas for use in a micro power unit. The non-combusting gas generator includes a propellant chamber housing a dense non-combustible propellant. The propellant is introduced to a reaction chamber including a porous reaction matrix having a catalyst suspended in the porous reaction matrix. The catalyst catalyzes the propellant within the reaction matrix and generates exhaust gases for use by one or more mechanical and electrical systems. Combining the gas generator with power generation systems including, but not limited to, turbine assemblies and electric generators forms a micro power unit configured to generate significant power as a closed compact system.

The gas generator assembly introduces and consumes the propellant (e.g., an amine based propellant, such as hydroxyl ammonium nitrate) within a closed system. The gas generator assembly does not require ambient air or supplemental fuels mixed with the propellant to catalyze or react the propellant and produce the exhaust gases. Stated another way, the gas generator assembly does not combust the propellant (e.g., with ambient air). Instead, the propellant is catalyzed and consumed within a closed system and the exhaust gases are reliably produced in substantially any environment (e.g., vacuum, high and low oxygen environments and the like).

Further, the propellant used with the gas generator assembly is a stable non-combustible propellant. In one example, the propellant is an amine based propellant, such as hydroxyl ammonium nitrate. As described herein, the amine based propellant is catalyzed within the porous reaction matrix including a catalyst to produce exhaust gases. The non-combusting propellant is not combustible by itself and is correspondingly stable. Accordingly, the propellant may be stored for months or years with no significant performance degradation. Additionally, because the propellant is non-combustible it is a minimal hazard to transport and store relative to other combustible propellants. Further still, in the case of the amine based propellant described herein the propellant is dense (e.g., with a specific gravity greater than around 1.6) and a small amount of the propellant generates a significant amount of exhaust gas. The gas generator assembly including the amine based propellant thereby has a small form factor.

The gas generator assembly is readily incorporated as a small light weight component of devices including, but not limited to, miniaturized UAVs and other field equipment while still delivering significant power to the devices over a specified operational lifespan.

Moreover, the exhaust gas generated by the non-combusting gas generator is directed through a discharge nozzle for use by one or more components. In one example, the exhaust gas is accelerated to supersonic velocity (e.g., 5000 to 7000 feet per second) and impinges against one or more tangential cups of an impulse turbine. The impulse turbine relies heavily on the velocity of the exhaust gas (as opposed to volumetric flow rate used in axial turbines) to rotate and correspondingly generate power. The discharge nozzle minimizes the volumetric flow rate and thereby conserves the propellant for extended performance of the gas generator assembly and operation of the impulse turbine. As described herein the impulse turbine assembly is coupled with one or more of an electric generator to generate electric power or a reduction drive coupled with a propulsion device (e.g., a propeller) of a miniaturized UAV. Furthermore, during operation of the gas generator the propellant is gradually consumed and exhausted from the UAV. The weight of the UAV gradually decreases over its operation and thereby extends the operational lifespan.

In the foregoing description, the subject matter has been described with reference to specific exemplary examples. However, it will be appreciated that various modifications and changes may be made without departing from the scope of the present subject matter as set forth herein. The description and figures are to be regarded in an illustrative manner, rather than a restrictive one and all such modifications are intended to be included within the scope of the present subject matter. Accordingly, the scope of the subject matter should be determined by the generic examples described herein and their legal equivalents rather than by merely the specific examples described above. For example, the steps recited in any method or process example may be executed in any order and are not limited to the explicit order presented in the specific examples. Additionally, the components and/or elements recited in any apparatus example may be assembled or otherwise operationally configured in a variety of permutations to produce substantially the same result as the present subject matter and are accordingly not limited to the specific configuration recited in the specific examples.

Benefits, other advantages and solutions to problems have been described above with regard to particular examples; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present subject matter, in addition to those not specifically recited, may be varied or otherwise particularly adapted to specific environments, manufacturing specifications, design parameters or other operating requirements without departing from the general principles of the same.

The present subject matter has been described above with reference to examples. However, changes and modifications may be made to the examples without departing from the scope of the present subject matter. These and other changes or modifications are intended to be included within the scope of the present subject matter, as expressed in the following claims.

It is to be understood that the above description is intended to be illustrative, and not restrictive. Many other examples will be apparent to those of skill in the art upon reading and understanding the above description. It should be noted that examples discussed in different portions of the description or referred to in different drawings can be combined to form additional examples of the present application. The scope of the subject matter should, therefore, be determined with reference to the appended claims, along with the full scope of equivalents to which such claims are entitled.

What is claimed is:

1. A gas generator assembly comprising:
 a pressure generator;
 a propellant chamber coupled with the pressure generator, the propellant chamber houses a fluid amine based mono-propellant;
 a reaction chamber coupled with the propellant chamber, the reaction chamber includes:
  a reaction chamber housing,
  a porous reaction matrix including a plurality of linear matrix passages within the reaction chamber housing, the reaction matrix includes a catalyzing agent coupled along the plurality of linear matrix passages, and the catalyzing agent is configured to non-combustibly catalyze the amine based mono-propellant into one or more pressurized gases as the amine based mono-propellant passes through the plurality of linear matrix passages,
  an injector in communication with the propellant chamber, the injector is configured to deliver the amine based mono-propellant to the porous reaction matrix, and
  a preheating substrate coupled with the porous reaction matrix, the preheating substrate including a hypergolic substance configured to react with the amine based mono-propellant to preheat the porous reaction matrix; and
 a discharge nozzle coupled with the reaction chamber, the discharge nozzle is configured to accelerate and discharge the one or more pressurized gases.

2. The gas generator assembly of claim 1, wherein the amine based mono-propellant has a specific gravity greater than or equal to around 1.6.

3. The gas generator assembly of claim 1, wherein the discharge nozzle is a rocket discharge nozzle, and the rocket discharge nozzle is configured to accelerate the one or more pressurized gases to supersonic velocity of around 5000 to 7000 feet per second.

4. The gas generator assembly of claim 1, wherein the propellant chamber and the reaction chamber are a closed system, and the porous reaction matrix and the amine based mono-propellant are isolated from ambient air while the porous reaction matrix non-combustibly catalyzes the amine based mono-propellant.

5. The gas generator assembly of claim 1, wherein the porous reaction matrix includes aluminum oxide and the catalyzing agent includes platinum particles within the porous reaction matrix.

6. The gas generator assembly of claim 1, wherein the non-combusting amine based mono-propellant includes hydroxyl ammonium nitrate.

7. The gas generator assembly of claim 1 comprising:
 a propellant throttle coupled between the propellant chamber and the reaction chamber; and
 a temperature sensor coupled with the porous reaction matrix, wherein propellant throttle is configured to meter a flow of the amine based mono-propellant to the porous reaction matrix according to measurements of the temperature sensor.

8. The gas generator assembly of claim 1, wherein the preheating substrate includes a preheating substrate pillow with the hypergolic substance therein, and the preheating substrate pillow is coupled along the porous reaction matrix and blankets openings of the plurality of linear matrix passages.

9. A method for using a gas generator comprising:
 delivering an amine based mono-propellant to a reaction chamber;
 directing the amine based mono-propellant through a plurality of linear matrix passages of a porous reaction matrix, the porous reaction matrix includes a catalyzing agent coupled along the plurality of linear matrix passages of the of the porous reaction matrix;
 preheating the porous reaction matrix with a preheating substrate pillow including a hypergolic substance, the preheating substrate pillow coupled along a face of the porous reaction matrix, the hypergolic substance configured to react with the amine based mono-propellant to preheat the porous reaction matrix;
 non-combustibly catalyzing the amine based mono-propellant into one or more pressurized gases with the porous reaction matrix; and
 accelerating and discharging the one or more pressurized gases through a discharge nozzle.

10. The method of claim 9, wherein accelerating and discharging the one or more pressurized gases includes accelerating the one or more pressurized gases to supersonic velocity.

11. The method of claim 9, wherein non-combustibly catalyzing the amine based mono-propellant includes non-combustible catalyzing in a closed system, wherein the porous reaction matrix and the amine based mono-propellant are isolated from ambient air.

12. The method of claim 9, wherein preheating includes:
 delivering a preheating pulse of the amine based mono-propellant to the preheating substrate pillow including a hypergolic substance, and
 reacting the amine based mono-propellant with the hypergolic substance to produce heat.

13. The method of claim 9 comprising:
 measuring the temperature of the porous reaction matrix against a temperature threshold; and
 delivering a catalyzing stream of the amine based mono-propellant to the porous reaction matrix if the temperature meets or exceeds the temperature threshold.

14. The method of claim 9, wherein accelerating and discharging the one or more pressurized gases includes discharging the one or more pressurized gases including oxygen generated through non-combustibly catalyzing through a rocket motor, and the rocket motor includes a solid fuel configured for combustion with the oxygen.

15. The method of claim 9, wherein accelerating and discharging the one or more pressurized gases includes discharging the one or more pressurized gases against an impulse turbine.

16. The method of claim 15 comprising throttling power generated from the impulse turbine through throttling delivery of the amine based mono-propellant to the reaction chamber.

* * * * *

UNITED STATES PATENT AND TRADEMARK OFFICE
CERTIFICATE OF CORRECTION

PATENT NO. : 8,636,247 B2
APPLICATION NO. : 13/089441
DATED : January 28, 2014
INVENTOR(S) : Danforth et al.

It is certified that error appears in the above-identified patent and that said Letters Patent is hereby corrected as shown below:

In The Specification

In column 7, line 7, after "time", insert --.--, therefor

In column 10, line 39, delete "108" and insert --106--, therefor

In column 10, line 44, delete "impulse turbine 504 assembly" and insert --impulse turbine assembly 504--, therefor In column 12, line 4, delete "pulse" and insert --impulse--, therefor In column 16, line 9, delete "FIG. 20" and insert --FIG. 2--, therefor In column 16, line 11, delete "the from" and insert --from the--, therefor In column 17, line 25, delete "800" and insert --900--, therefor In column 20, line 32-33, delete "FIG. 2A" and insert --FIG. 2--, therefor In column 21, line 21, delete "1080" and insert --1008--, therefor Signed and Sealed this
Fifth Day of July, 2016

Michelle K. Lee
*Director of the United States Patent and Trademark Office*